(12) United States Patent
Teague et al.

(10) Patent No.: US 11,501,647 B2
(45) Date of Patent: Nov. 15, 2022

(54) ESTIMATED WAKE TURBULENCE TRAIL FOR AIRCRAFT SYSTEM

(71) Applicant: Rockwell Collins, Inc., Cedar Rapids, IA (US)

(72) Inventors: Jacob Teague, West Melbourne, FL (US); Christopher Crain, Palm Bay, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 96 days.

(21) Appl. No.: 17/028,483

(22) Filed: Sep. 22, 2020

(65) Prior Publication Data

US 2022/0092993 A1 Mar. 24, 2022

(51) Int. Cl.
*G08G 5/00* (2006.01)
(52) U.S. Cl.
CPC ........... *G08G 5/0017* (2013.01); *G08G 5/006* (2013.01); *G08G 5/0026* (2013.01); *G08G 5/0069* (2013.01); *G08G 5/0073* (2013.01)
(58) Field of Classification Search
CPC .... G08G 5/0026; G08G 5/006; G08G 5/0069; G08G 5/0073
See application file for complete search history.

(56) References Cited

U.S. PATENT DOCUMENTS

| | | | |
|---|---|---|---|
| 5,845,874 A * | 12/1998 | Beasley | G06T 17/00 73/147 |
| 6,963,291 B2 | 11/2005 | Holforty et al. | |
| 7,411,519 B1 | 8/2008 | Kuntman et al. | |
| 8,949,014 B2 | 2/2015 | Bateman et al. | |
| 9,037,319 B2 | 5/2015 | Conner et al. | |
| 9,201,136 B2 | 12/2015 | Khatwa et al. | |
| 9,709,698 B2 | 7/2017 | Nykl et al. | |
| 9,911,342 B2 | 3/2018 | Herder | |
| 10,276,050 B2 | 4/2019 | Reinke et al. | |

(Continued)

FOREIGN PATENT DOCUMENTS

| | | |
|---|---|---|
| CN | 108198462 B | 12/2018 |
| CN | 106485954 B | 2/2019 |

(Continued)

OTHER PUBLICATIONS

Extended Search Report in European Application No. 21198325.9 dated Feb. 15, 2022, 17 pages.

*Primary Examiner* — Shon G Foley
(74) *Attorney, Agent, or Firm* — Suiter Swantz pc llo (57) ABSTRACT

A system may include at least one processor. The at least one processor may be configured to: obtain air traffic data associated with at least one air traffic target; based at least on the air traffic data, determine at least one estimated wake turbulence trail for each of the at least one air traffic target; and at least one of: (a) generate at least one display image based at least on the at least one estimated wake turbulence trail and output the at least one display image to at least one display for presentation to a user, each of the at least one display image including at least one wake turbulence trail indicator, the at least one wake turbulence trail indicator generated based at least on the at least one estimated wake turbulence trail; or (b) operate the aircraft to avoid the at least one estimated wake turbulence trail.

12 Claims, 9 Drawing Sheets

(56) References Cited

U.S. PATENT DOCUMENTS

| | | |
|---|---|---|
| 10,446,040 B2 | 10/2019 | Hosamani et al. |
| 10,502,584 B1 * | 12/2019 | Suiter .................. G08G 5/0069 |
| 10,876,857 B1 * | 12/2020 | Kanagarajan ........ G08G 5/0091 |
| 2003/0222795 A1 * | 12/2003 | Holforty ................ B64D 43/00 |
| | | 340/968 |
| 2008/0035784 A1 | 2/2008 | Meserole et al. |
| 2020/0098272 A1 | 3/2020 | Manberg et al. |

FOREIGN PATENT DOCUMENTS

| | | |
|---|---|---|
| EP | 1185849 A1 | 3/2002 |
| EP | 2354805 A1 | 8/2011 |
| EP | 2851889 A2 | 3/2015 |
| RU | 2701062 C1 | 9/2019 |

* cited by examiner

ESTIMATED WAKE TURBULENCE TRAIL FOR AIRCRAFT SYSTEM

BACKGROUND

Air traffic density is expected to continue to increase with the advent of urban air mobility (UAM). UAMs are smaller than modern aircraft and are not as likely to recover from wake turbulence which could result in catastrophic events.

SUMMARY

In one aspect, embodiments of the inventive concepts disclosed herein are directed to a system. The system may include at least one processor. The at least one processor may be configured to: obtain air traffic data associated with at least one air traffic target; based at least on the air traffic data, determine at least one estimated wake turbulence trail for each of the at least one air traffic target; and at least one of: (a) generate at least one display image based at least on the at least one estimated wake turbulence trail and output the at least one display image to at least one display for presentation to a user, each of the at least one display image including at least one wake turbulence trail indicator, the at least one wake turbulence trail indicator generated based at least on the at least one estimated wake turbulence trail; or (b) operate the aircraft to avoid the at least one estimated wake turbulence trail.

In a further aspect, embodiments of the inventive concepts disclosed herein are directed to a method. The method may include: obtaining, by at least one processor, air traffic data associated with at least one air traffic target; based at least on the air traffic data, determining, by the at least one processor, at least one estimated wake turbulence trail for each of the at least one air traffic target; and by the at least one processor, at least one of: (a) generating at least one display image based at least on the at least one estimated wake turbulence trail and outputting the at least one display image to at least one display for presentation to a user, each of the at least one display image including at least one wake turbulence trail indicator, the at least one wake turbulence trail indicator generated based at least on the at least one estimated wake turbulence trail; or (b) operating the aircraft to avoid the at least one estimated wake turbulence trail.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system (e.g., an aircraft system) and a method configured to, based at least on air traffic data, determine at least one estimated wake turbulence trail for at least one air traffic target. Some embodiments may display a detailed view of wake turbulence fields for use in flight path adjustments, which may increase operational efficiency and threat avoidance and may improve safety. Some embodiments may use estimated wake turbulence fields to control operation of an aircraft (e.g., a manned aircraft or an unmanned aerial system (UAS) (e.g., a remote piloted UAS or an autonomous UAS)).

Some embodiments may track air traffic target positions over time and estimate a wake turbulence field along each air traffic target's flight path. This may include wake turbulence falloff estimation and a relative altitude indicator to determine the proximity of the turbulence threat. Some embodiments may include a priority scheme, where if two air traffic targets having associated indicators, that if depicted separately such indicators would overlap, an indicator representing a closest vertical distance to ownship may be displayed rather than an indicator(s) having a larger vertical distance to the ownship due to a greater proximity threat.

Figure 1A:
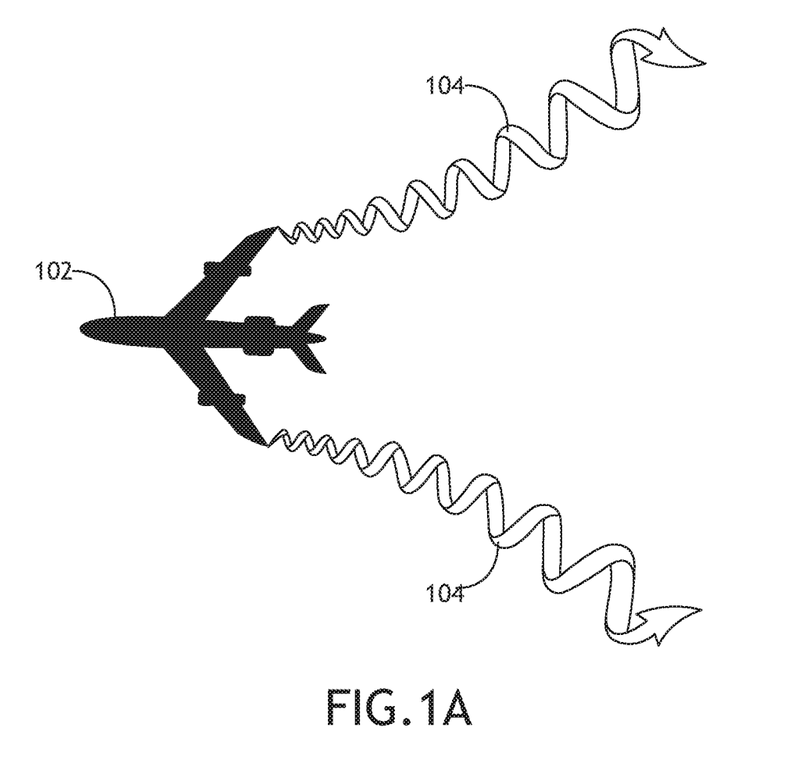
FIG. 1A is an overhead view of an exemplary embodiment of an air traffic target having wake turbulence trails according to the inventive concepts disclosed herein.
Figure 1B:
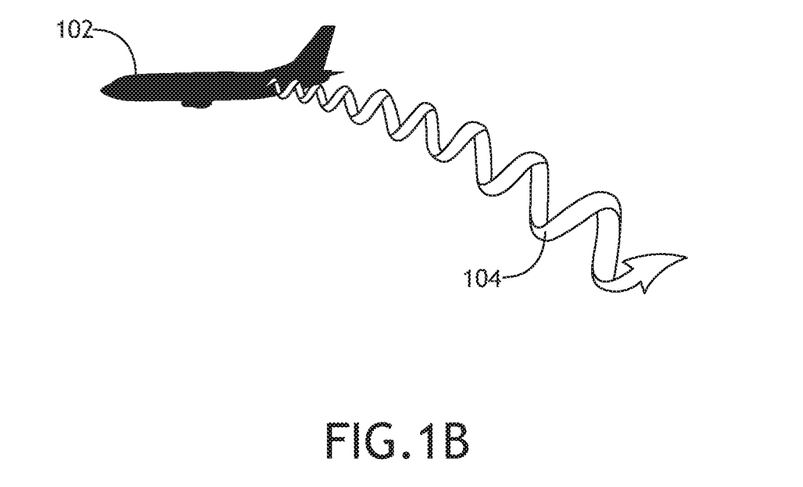
FIG. 1B is a side view of the air traffic target having wake turbulence trails of FIG. 1A according to the inventive concepts disclosed herein.
Figure 4:
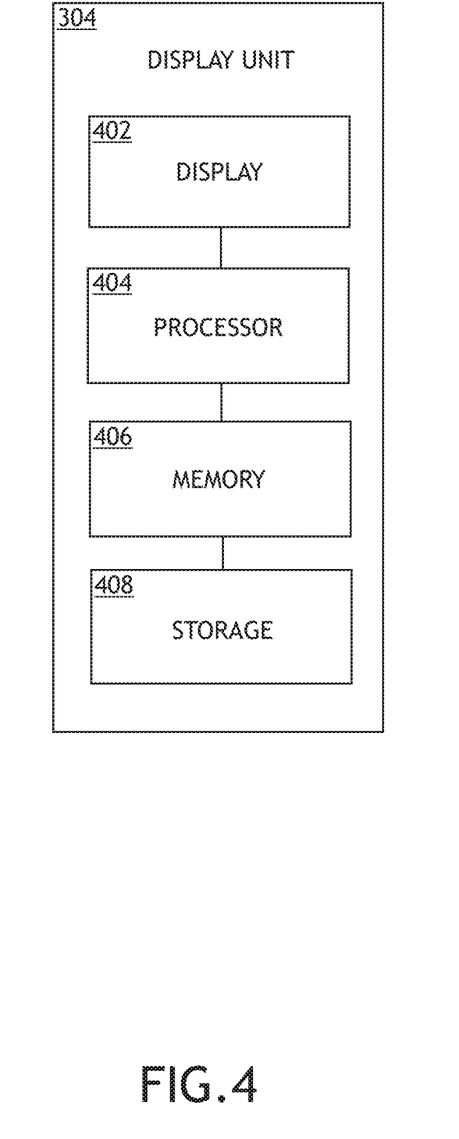
FIG. 4 is a view of an exemplary embodiment of a display unit computing device of the system of FIG. 3 according to the inventive concepts disclosed herein.
Figure 5:
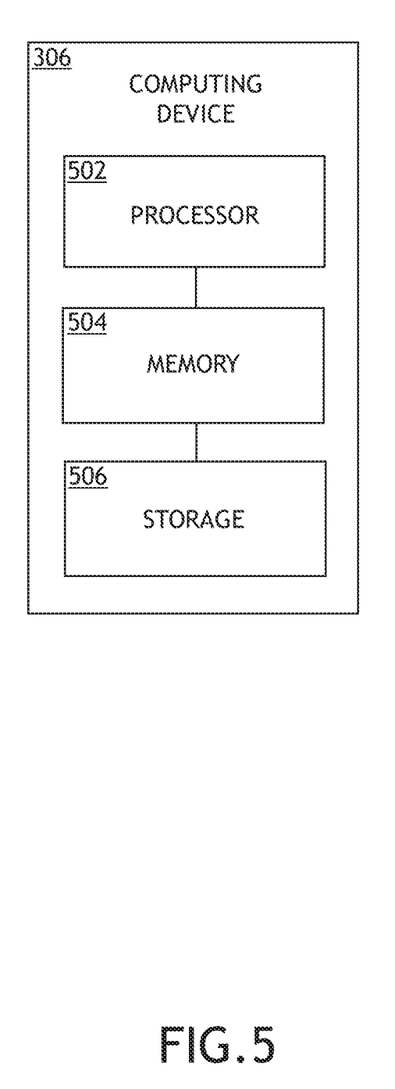
FIG. 5 is a view of an exemplary embodiment of an aircraft computing device of the system of FIG. 3 according to the inventive concepts disclosed herein.
Figure 6:
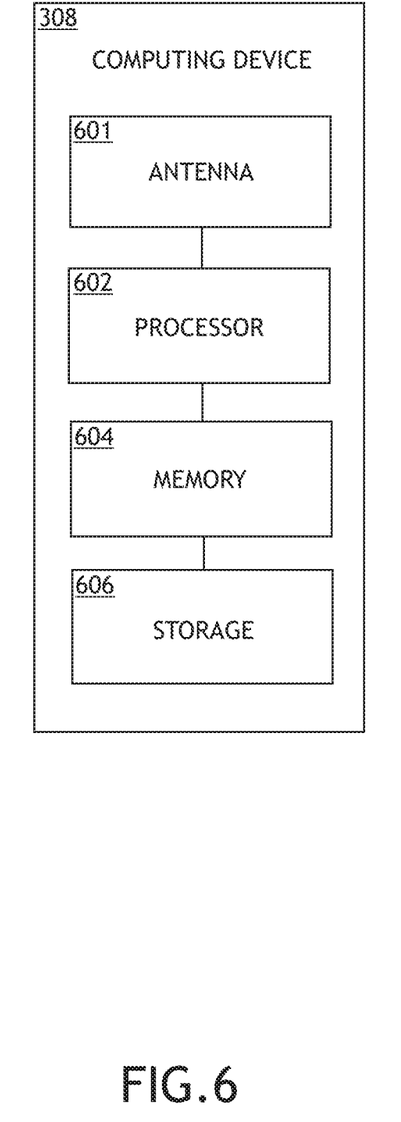
FIG. 6 is a view of an exemplary embodiment of a computing device of the system of FIG. 3 according to the inventive concepts disclosed herein.

Referring now to FIGS. 1A and 1B exemplary embodiments of at least one air traffic target 102 having wake turbulence trails 104 are shown. FIG. 1A shows an overhead view of the air traffic target 102 having the wake turbulence trails 104. FIG. 1B shows a side view of the air traffic target 102 having the wake turbulence trails 104. The wake turbulence trails 104 may be vortices that spread laterally from a rear of the air traffic target 102. For example, the wake turbulence trails 104 can extend up to 5 miles or more from the air traffic target 102. The wake turbulence trails 104 may also drop in altitude as the wake turbulence trails 104 extend away from the air traffic target 102. For example, the wake turbulence trails 104 can drop by up to 900 feet or more (e.g., 500-900 feet) at a furthest point from the air traffic target 102. For example, based at least on typical wake turbulence trail characteristics and at least one of an aircraft size, an aircraft flight path, an aircraft speed, or an altitude of the air traffic target 102, at least one processor (e.g., 404, 502, and/or 602, as shown in FIGS. 4-6) may be configured to determine (e.g., calculate) at least one estimated wake turbulence trail for the air traffic target 102.

Referring now to FIGS. 2A, 2B, 2C, and 2D exemplary embodiments of at least one wake turbulence trail indicator 208 and at least one air traffic current position indicator 202 that may be depicted in at least one display image (e.g., a horizontal display image 200A, a vertical display image 200B, an orthogonal view display image 200C, and/or a side view display image 200D) are shown.

Figure 2A:
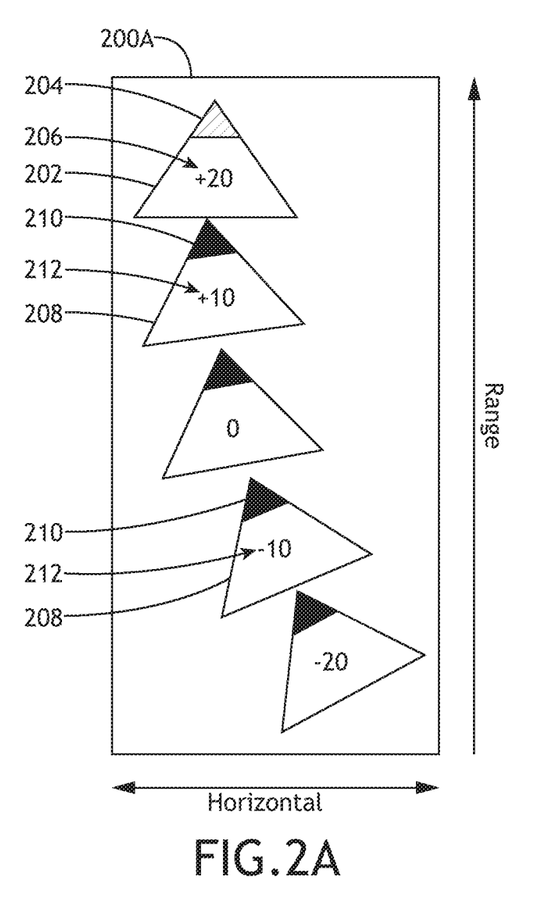
FIG. 2A is a view of an exemplary embodiment of a horizontal display image including at least one wake turbulence trail indicator and at least one air traffic current position indicator according to the inventive concepts disclosed herein.

Referring to FIG. 2A, the horizontal display image 200A may convey a range dimension and a horizontal dimension. The display image 200A may depict at least one wake turbulence trail indicator 208 and at least one air traffic current position indicator 202. Each of the at least one wake turbulence trail indicator 208 and the at least one air traffic current position indicator 202 may be positioned (e.g., in the display image 200A) respective to a corresponding range and horizontal location relative to a position of the aircraft (e.g., 302). There may be an air traffic current position indicator 202 and at least one wake turbulence trail indicator 208 for each of the at least one air traffic target 102. Each of the at least one wake turbulence trail indicator 208 may be generated based at least on an estimated wake turbulence trail to represent a point on the estimated wake turbulence trail. Each air traffic current position indicator 202 may include a numerical value 206 indicating an amount of a vertical distance of a given air traffic target 102 above or below the aircraft (e.g., 302). For example, a numerical value of "+20" may refer to 200 feet above the aircraft (e.g., 302), and a numerical value of "-10" may refer to 100 feet below the aircraft (e.g., 302). Each wake turbulence trail indicator 208 may be associated with a given wake trail location, wherein each wake turbulence trail indicator 208 may include a numerical value 212 indicating an amount of a vertical distance of the given wake trail location above or below the aircraft (e.g., 302). Each air traffic current position indicator 202 and wake turbulence trail indicator 208 may include a directional indicator 204, 210 indicating a direction of flight of the given air traffic target 102. Each air traffic current position indicator 202 and wake turbulence trail indicator 208 may have any suitable geometric shape (e.g., defined by at least one line and/or at least one curve; e.g., a triangle shape, as shown).

Figure 2B:
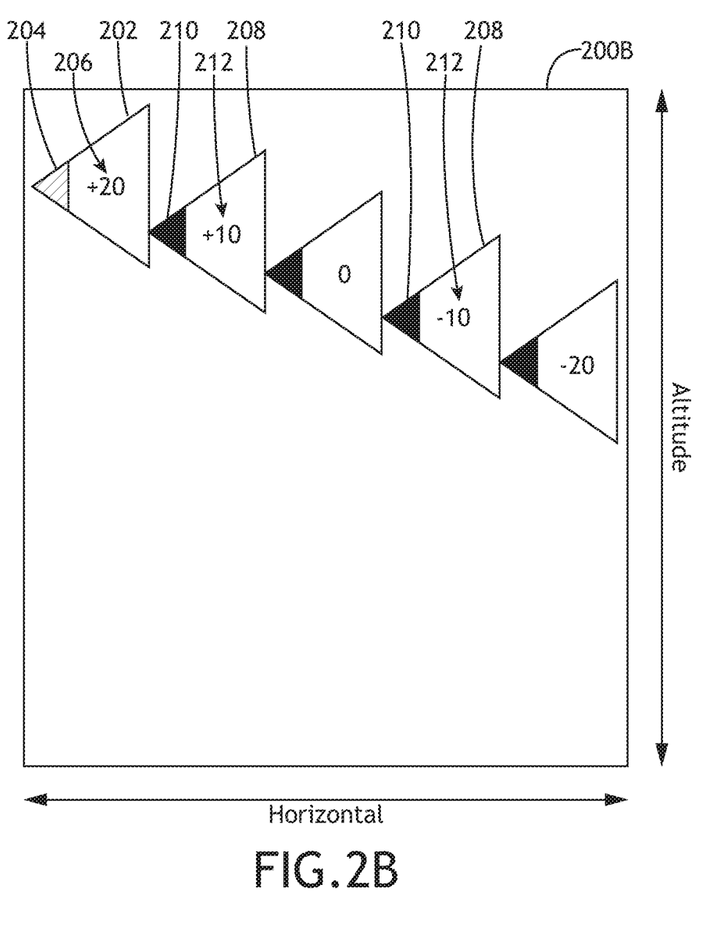
FIG. 2B is a view of an exemplary embodiment of a vertical display image including at least one wake turbulence trail indicator and at least one air traffic current position indicator according to the inventive concepts disclosed herein.
Figure 2C:
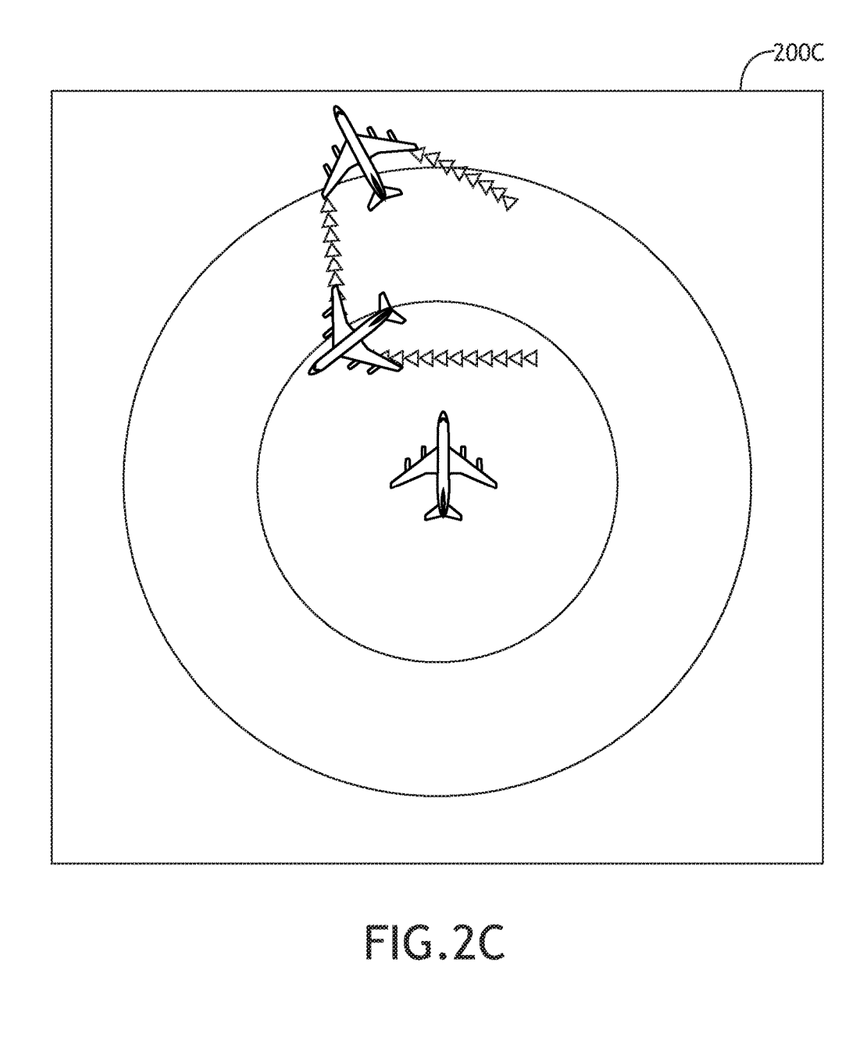
FIG. 2C is a view of an exemplary embodiment of an orthogonal view display image including at least one wake turbulence trail indicator and at least one air traffic current position indicator according to the inventive concepts disclosed herein.
Figure 2D:
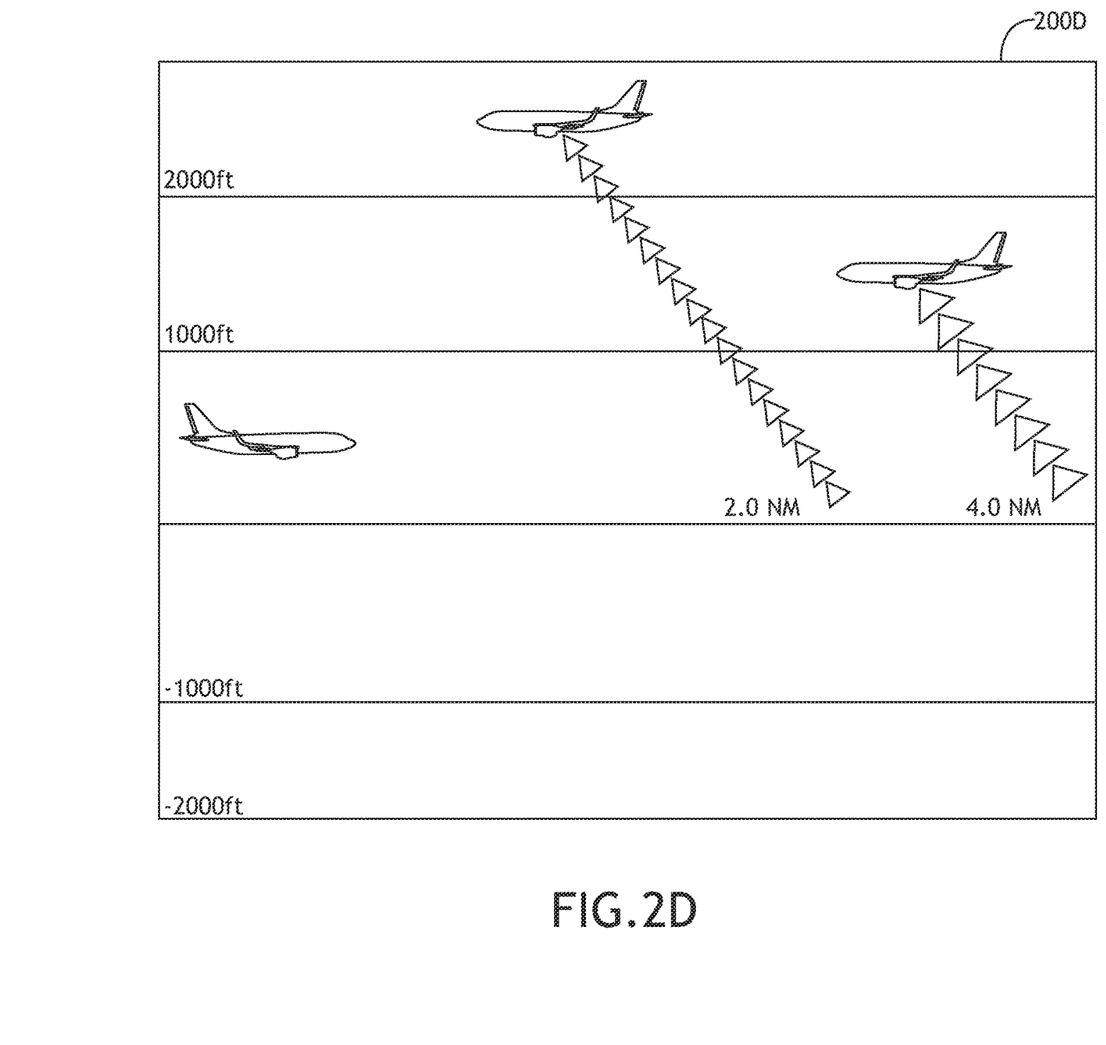
FIG. 2D is a view of an exemplary embodiment of a side view display image including at least one wake turbulence trail indicator and at least one air traffic current position indicator according to the inventive concepts disclosed herein.
Figure 3:
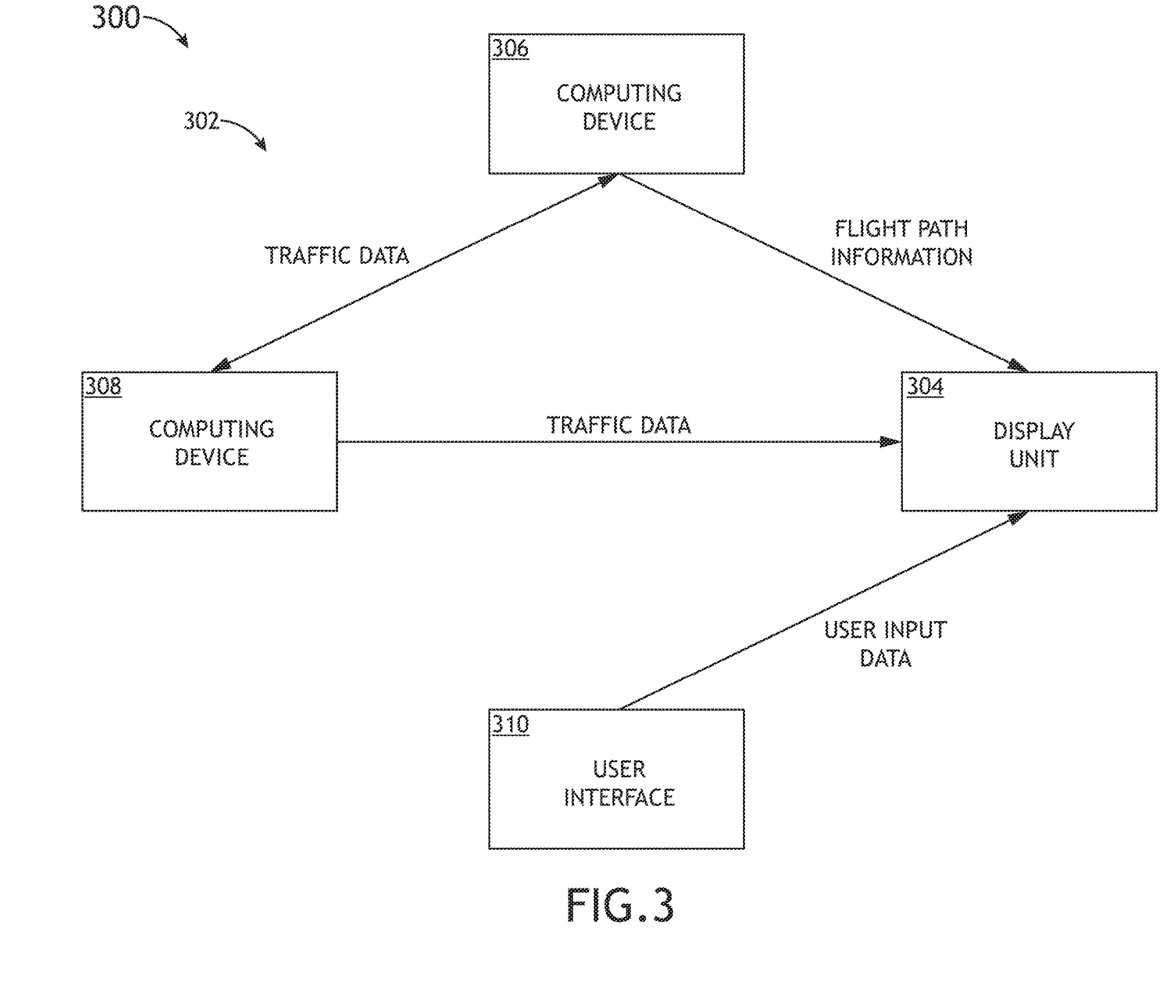
FIG. 3 is a view of an exemplary embodiment of a system according to the inventive concepts disclosed herein.

Referring to FIG. 2B, the vertical display image 200B may convey a vertical dimension and a horizontal dimension. The display image 200B may depict at least one wake turbulence trail indicator 208 and at least one air traffic current position indicator 202, as similarly described with respect to FIG. 2A. Each of the at least one wake turbulence trail indicator 208 and the at least one air traffic current position indicator 202 may be positioned (e.g., in the display image 200B) respective to a corresponding vertical and horizontal location relative to a position of the aircraft (e.g., 302).

Still referring to FIGS. 2A and 2B, in some embodiments, if there are multiple air traffic current position indicators 202 and/or multiple wake turbulence trail indicators 208 that, if displayed on the display image 200A or 200B, would overlap, at least one processor (e.g., 404, 502, and/or 602, as shown in FIGS. 4-6) may be configured to only display the indicator 202, 208 that is vertically closest to the aircraft (e.g., 302).

While a horizontal display image 200A, a vertical display image 200B, an orthogonal view display image 200C, and a side view display image 200D are exemplarily shown, some embodiments may include a three-dimensional display image that can be generated and that may show air traffic current position indicator(s) 202 and wake turbulence trail indicator(s) 208.

Referring now to FIGS. 3-6, an exemplary embodiment of a system 300 according to the inventive concepts disclosed herein is depicted. In some embodiments, the system may include an aircraft 302, which may include at least one user (e.g., flight crew and/or pilot(s)), at least one display unit computing device 304, at least one aircraft computing device 306, at least one computing device 308 (e.g., at least one automatic dependent surveillance-broadcast (ADS-B) computing device and/or at least one radar computing device), and/or at least one user interface 310, some or all of which may be communicatively coupled at any given time. In some embodiments, the aircraft 302 may include an onboard pilot; in some embodiments, the aircraft 302 may be a UAS (e.g., a remote-piloted UAS and/or an autonomous UAS). In some embodiments, the at least one display unit computing device 304, the at least one aircraft computing device 306, the at least one computing device 308, and/or the at least one user interface 310 may be implemented as a single computing device or any number of computing devices configured to perform (e.g., collectively perform if more than one computing device) any or all of the operations disclosed throughout. The at least one display unit computing device 304, the at least one aircraft computing device 306, the at least one computing device 308, and/or the at least one user interface 310 may be installed in the aircraft 302.

The user may be a pilot or crew member. The user may interface with the system 300 via the at least one user interface 310. The at least one user interface 310 may be implemented as any suitable user interface, such as a touchscreen (e.g., of the display unit computing device 304 and/or another display unit), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface 310 may be configured to receive at least one user input and to output the at least one user input to a computing device (e.g., 304, 306, and/or 308). For example, a pilot of the aircraft 104 may be able to interface with the user interface 310 to: engage (or disengage) a mode to cause the display image 200A, 200B, 200C, and/or 200D to be displayed. For example, such user inputs may be output to the computing device 308 and/or the display unit computing device 304.

The display unit computing device 304 may be implemented as any suitable computing device, such as a primary flight display (PFD) computing device and/or a multi-function window (MFW) display computing device. As shown in FIG. 4, the display unit computing device 304 may include at least one display 402, at least one processor 404, at least one memory 406, and/or at least one storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the processor 404 may be configured to: obtain air traffic data (e.g., automatic dependent surveillance-broadcast (ADS-B) data and/or radar data from the computing device 308) associated with at least one air traffic target 102; obtain aircraft data (e.g., from the computing device 306); based at least on the air traffic data and/or the aircraft data, determine at least one estimated wake turbulence trail for each of the at least one air traffic target 102; based at least on at least one of the aircraft size, the aircraft flight path, the aircraft speed, or the altitude of the air traffic target 102, determine at least one estimated wake turbulence trail for the air traffic target 102; generate at least one display image 200A, 200B, 200C, and/or 200D based at least on the at least one estimated wake turbulence trail; output the at least one display image 200A, 200B, 200C, and/or 200D as graphical data to at least one display 402 for presentation to a user, each of the at least one display image 200A, 200B, 200C, and/or 200D including at least one wake turbulence trail indicator 208, the at least one wake turbulence trail indicator 208 generated based at least on the at least one estimated wake turbulence trail; and/or operate the aircraft 302 to avoid the at least one estimated wake turbulence trail. The at least one display 402 may be configured to: display the at least one display image 200A, 200B, 200C, and/or 200D to the user.

The at least one aircraft computing device 306 may be implemented as any suitable computing device, such as a flight management system (FMS) computing device or a flight data computer. The at least one aircraft computing device 306 may include any or all of the elements, as shown in FIG. 5. For example, the aircraft computing device 306 may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., an FMS application) or computer code stored (e.g., maintained) in a non-transitory computer-readable medium (e.g., memory 504 and/or storage 506) and configured to execute various instructions or operations. The processor 502 of the aircraft computing device 306 may be configured to perform any or all of the operations disclosed throughout. For example, the processor 502 of the computing device 210A may be configured to: output aircraft data (e.g., FMS data, flight path data, inertial reference unit (IRU) data, flight data, and/or flight computer data) to the display unit computing device 304 and/or the computing device 308.

The at least one computing device 308 may be implemented as any suitable computing device, such as at least one ADS-B receiver computing device and/or at least one radar computing device. The at least one computing device 308 may include any or all of the elements shown in FIG. 6. For example, the computing device 308 may include at least one antenna 601, at least one processor 602, at least one memory 604, and/or at least one storage 606, some or all of which may be communicatively coupled at any given time. For example, the at least one processor 602 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 602 may include a CPU and a GPU configured to perform (e.g., collectively perform) any of the operations disclosed throughout. The processor 602 may be configured to run various software applications (e.g., an ADS-B application and/or a radar application) or computer code stored (e.g., maintained) in a non-transitory computer-readable medium (e.g., memory 604 and/or storage 606) and configured to execute various instructions or operations. The processor 602 of the computing device 308 may be configured to perform any or all of the operations disclosed throughout. For example, the processor 602 may be configured to: obtain air traffic data (e.g., automatic dependent surveillance-broadcast (ADS-B) data and/or radar data); and/or output air traffic data to the display unit computing device 304 and/or the aircraft computing device 306. In some embodiments, the air traffic data is or is derived from radar data, and for example, wherein the processor 602 processor may be further configured to track the at least one estimated wake turbulence trail for each of the at least one air traffic target 102 based at least on the radar data. In some embodiments, for each of the at least one air traffic target 102, at least one of an aircraft size, an aircraft flight path, an aircraft speed, or an altitude of an air traffic target 102 is at least one of included in or derived from the air traffic data.

For example, at least one processor (e.g., the at least one processor 404, the at least one processor 502, and/or the at least one processor 602) may be configured to (e.g., collectively configured to, if more than one processor): obtain air traffic data (e.g., automatic dependent surveillance-broadcast (ADS-B) data and/or radar data from the computing device 308) associated with at least one air traffic target 102; obtain aircraft data (e.g., from the computing device 306); based at least on the air traffic data and/or the aircraft data, determine at least one estimated wake turbulence trail for each of the at least one air traffic target 102; based at least on at least one of the aircraft size, the aircraft flight path, the aircraft speed, or the altitude of the air traffic target 102, determine at least one estimated wake turbulence trail for the air traffic target 102; generate at least one display image 200A, 200B, 200C, and/or 200D based at least on the at least one estimated wake turbulence trail; output the at least one display image 200A, 200B, 200C, and/or 200D as graphical data to at least one display 402 for presentation to a user, each of the at least one display image 200A, 200B, 200C, and/or 200D including at least one wake turbulence trail indicator 208, the at least one wake turbulence trail indicator 208 generated based at least on the at least one estimated wake turbulence trail; and/or operate the aircraft 302 to avoid the at least one estimated wake turbulence trail.

At least one processor (e.g., the at least one processor 404, the at least one processor 502, the at least one processor 602, and/or at least one processor located outside of the aircraft 302) may be configured to perform (e.g., collectively perform) any or all of the operations disclosed throughout.

Figure 7:
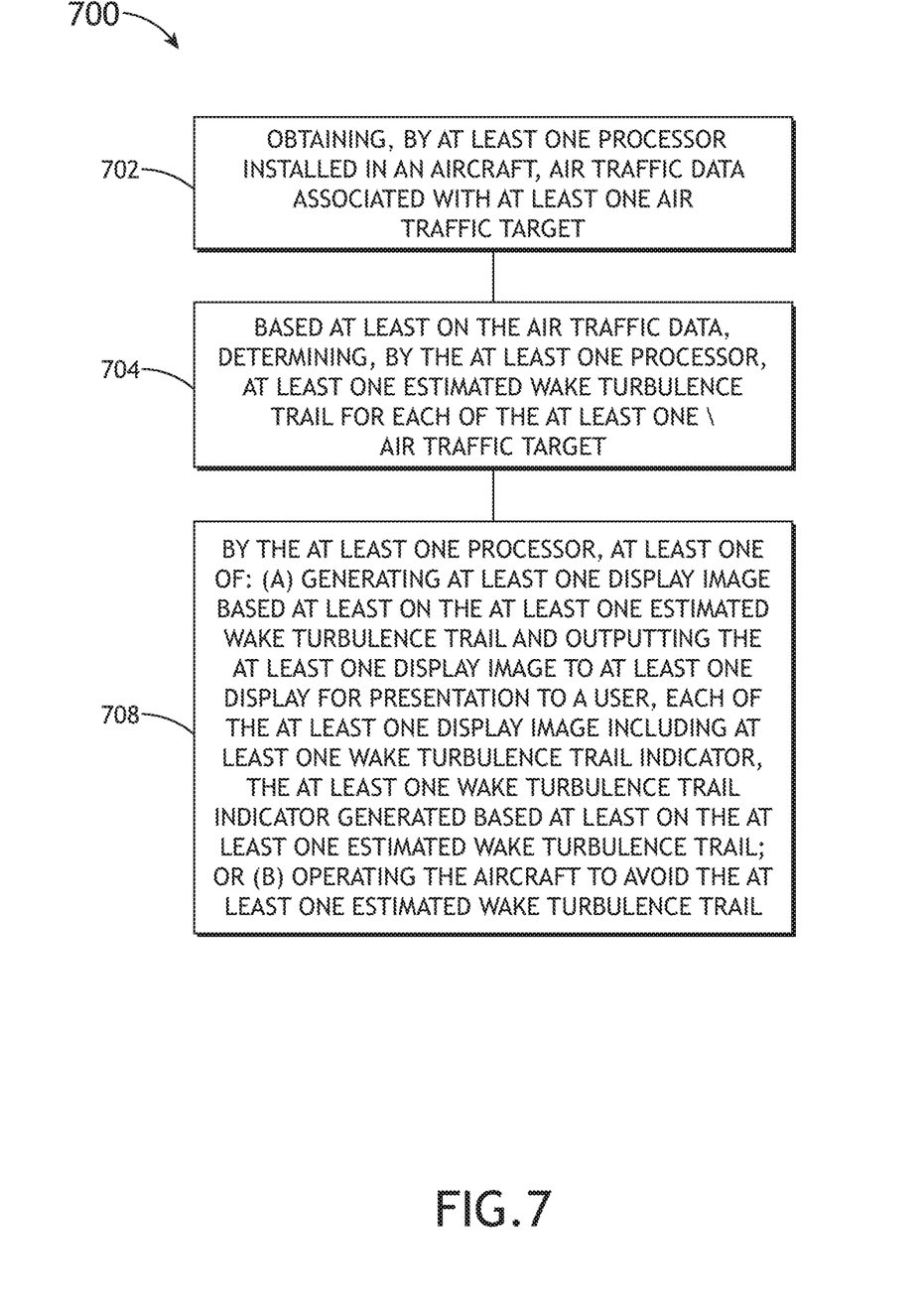
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include obtaining, by at least one processor (e.g., installed in an aircraft), air traffic data associated with at least one air traffic target.

A step 704 may include based at least on the air traffic data, determining, by the at least one processor, at least one estimated wake turbulence trail for each of the at least one air traffic target.

A step 706 may include by the at least one processor, at least one of: (a) generating at least one display image based at least on the at least one estimated wake turbulence trail and outputting the at least one display image to at least one display for presentation to a user, each of the at least one display image including at least one wake turbulence trail indicator, the at least one wake turbulence trail indicator generated based at least on the at least one estimated wake turbulence trail; or (b) operating the aircraft to avoid the at least one estimated wake turbulence trail.

Further, the method 700 may include any of the operations disclosed throughout.

As will be appreciated from the above, embodiments of the inventive concepts disclosed herein may be directed to a system (e.g., an aircraft system) and a method configured to, based at least on air traffic data, determine at least one estimated wake turbulence trail for at least one air traffic target.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one display; and
   at least one processor, the at least one processor configured to:
      obtain air traffic data associated with at least one air traffic target;
      based at least on the air traffic data, determine at least one estimated wake turbulence trail for each of the at least one air traffic target;
      generate at least one display image based at least on the at least one estimated wake turbulence trail; and
      output the at least one display image to the at least one display for presentation to a user, each of the at least one display image including at least two wake turbulence trail indicators, each of the at least two wake turbulence trail indicators generated based on one of the at least one estimated wake turbulence trail, wherein each of the at least one display image further includes an air traffic current position indicator for each of the at least one air traffic target, wherein each air traffic current position indicator includes, inside said air traffic current position indicator, a numerical value indicating an amount of a vertical distance of a given air traffic target above or below the aircraft, wherein each wake turbulence trail indicator is associated with a given wake trail location, wherein each wake turbulence trail indicator includes, inside said wake turbulence trail indicator, a numerical value indicating an amount of a vertical distance of the given wake trail location above or below the aircraft; and
      operate the aircraft based on the at least one estimated wake turbulence trail;
   wherein the at least one display is configured to: display the at least one display image to the user.

2. The system of claim 1, wherein, for each of the at least one air traffic target, at least one of an aircraft size, an aircraft flight path, an aircraft speed, or an altitude of an air traffic target is at least one of included in or derived from the air traffic data.

3. The system of claim 2, wherein, for each of the at least one air traffic target, the aircraft size, the aircraft flight path, the aircraft speed, and the altitude of the air traffic target is at least one of included in or derived from the air traffic data.

4. The system of claim 2, wherein the at least one processor is further configured to: based at least on at least one of the aircraft size, the aircraft flight path, the aircraft speed, or the altitude of the air traffic target, determine at least one estimated wake turbulence trail for the air traffic target.

5. The system of claim 1, wherein each air traffic current position indicator includes a directional indicator indicating a direction of flight of the given air traffic target.

6. The system of claim 1, wherein the at least one display image includes a horizontal display image and a vertical display image, wherein the horizontal display image conveys a range dimension and a horizontal dimension, wherein the horizontal display image depicts at least one first air traffic current position indicator and at least one first wake turbulence trail indicator, each of the at least one first air traffic current position indicator and the at least one first wake turbulence trail indicator positioned respective to a corresponding range and horizontal location relative to the aircraft, wherein the vertical display image conveys a vertical dimension and a horizontal dimension, wherein the vertical display image depicts at least one second air traffic current position indicator and at least one second wake turbulence trail indicator, each of the at least one second air traffic current position indicator and the at least one second wake turbulence trail indicator positioned respective to a corresponding vertical and horizontal location relative to the aircraft.

7. The system of claim 1, wherein the air traffic data is automatic dependent surveillance-broadcast (ADS-B) data.

8. The system of claim 1, wherein the at least one processor is further configured to: operate the aircraft to avoid the at least one estimated wake turbulence trail.

9. The system of claim 8, wherein the air traffic data is or is derived from radar data, wherein the at least one processor is further configured to track the at least one estimated wake turbulence trail for each of the at least one air traffic target based at least on the radar data.

10. The system of claim 8, wherein the aircraft is an unmanned aerial system (UAS).

11. The system of claim 10, wherein the UAS is an autonomous UAS.

12. A method, comprising:
   obtaining, by at least one processor, air traffic data associated with at least one air traffic target;
   based at least on the air traffic data, determining, by the at least one processor, at least one estimated wake turbulence trail for each of the at least one air traffic target;
   by the at least one processor, generating at least one display image based at least on the at least one estimated wake turbulence trail;
   outputting, by the at least one processor, the at least one display image to the at least one display for presentation to a user, each of the at least one display image including at least two wake turbulence trail indicators, each of the at least two wake turbulence trail indicators generated based on one of the at least one estimated wake turbulence trail, wherein each of the at least one display image further includes an air traffic current position indicator for each of the at least one air traffic target, wherein each air traffic current position indicator includes, inside said air traffic current position indicator, a numerical value indicating an amount of a vertical distance of a given air traffic target above or below the aircraft, wherein each wake turbulence trail indicator is associated with a given wake trail location, wherein each wake turbulence trail indicator includes, inside said wake turbulence trail indicator, a numerical value indicating an amount of a vertical distance of the given wake trail location above or below the aircraft operating, by the at least one processor, the aircraft based on the at least one estimated wake turbulence trail; and displaying, by the at least one display, the at least one display image to the user.

\* \* \* \* \*